May 28, 1929.  B. F. HAYDEN  1,715,325
SPREADING APPARATUS
Filed March 18, 1927  3 Sheets-Sheet 1

Inventor
Benjamin F. Hayden,
By Robert M. Barr.
Attorney

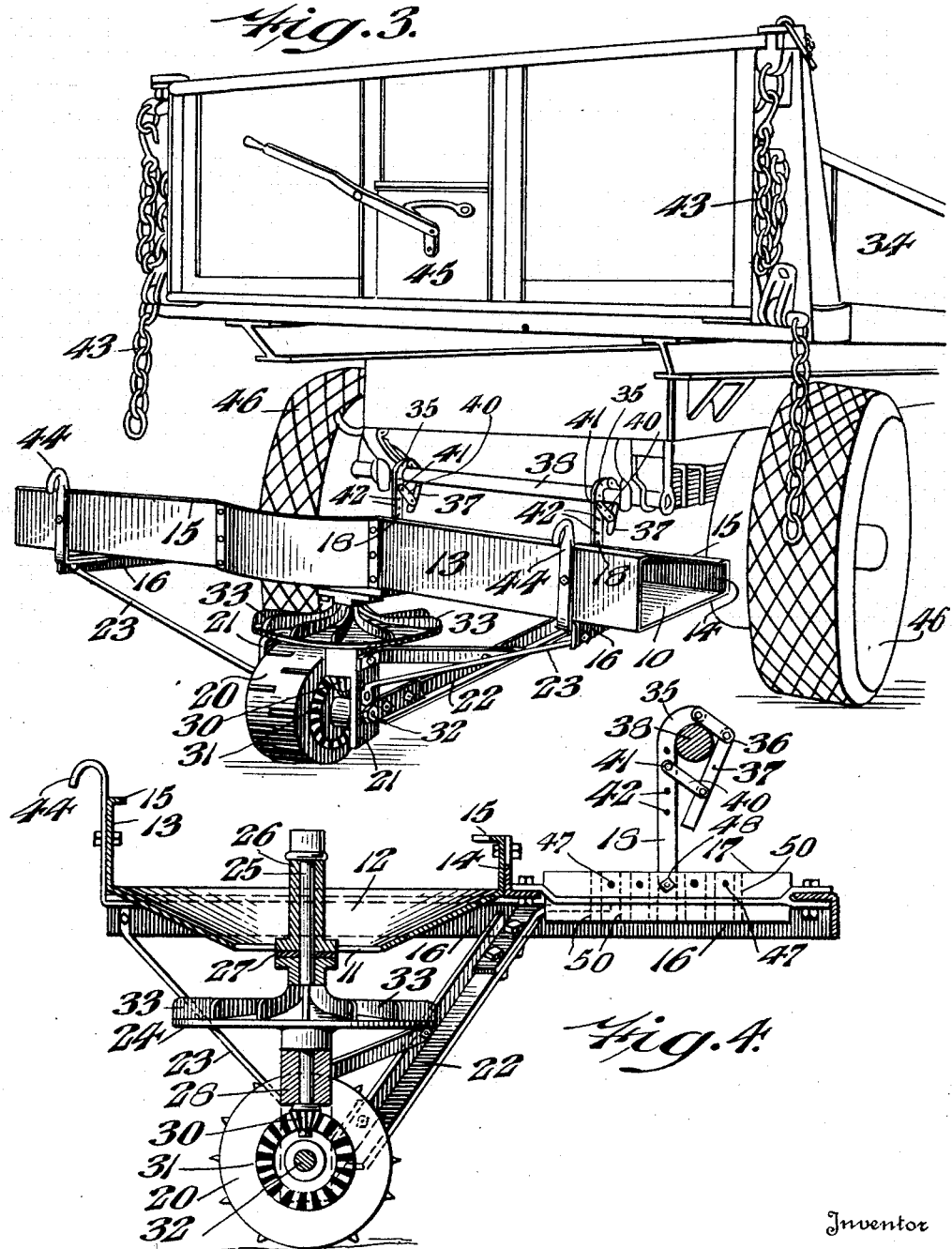

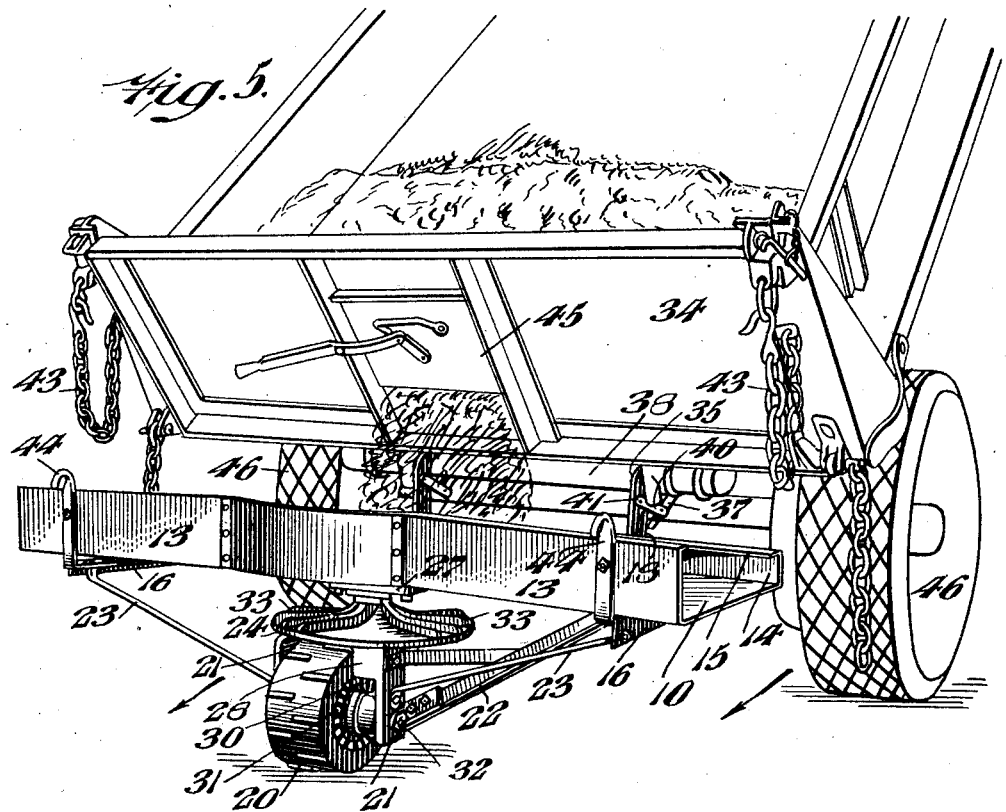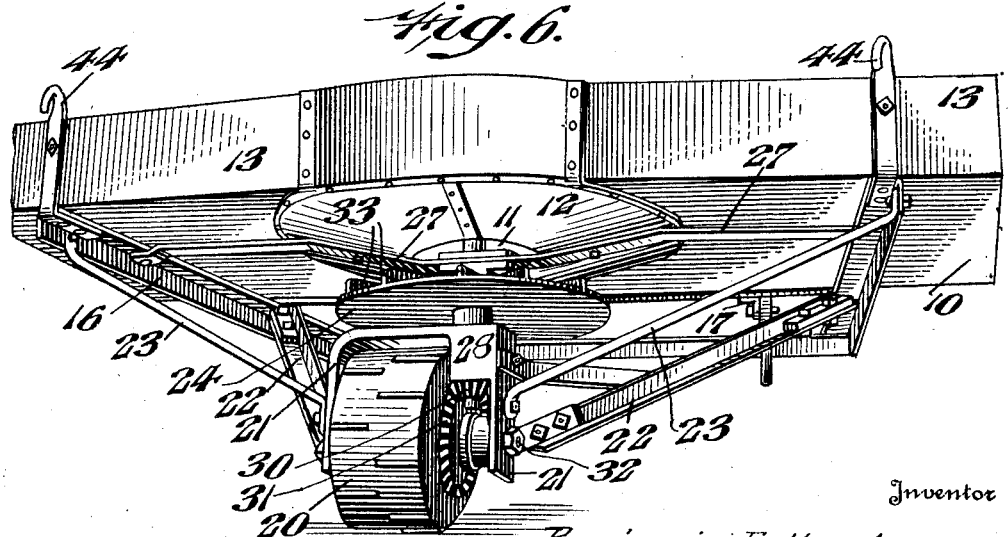

Patented May 28, 1929.

1,715,325

UNITED STATES PATENT OFFICE.

BENJAMIN F. HAYDEN, OF ST. LOUIS, MISSOURI, ASSIGNOR TO GOOD ROADS COMPANY, INC., OF UPPER DARBY, PENNSYLVANIA, A CORPORATION OF PENNSYLVANIA.

SPREADING APPARATUS.

Application filed March 18, 1927. Serial No. 176,419.

The present invention relates to road machines, and more particularly to a spreader for stone chips, sand, gravel or any other loose material to be distributed over a prepared surface, and the present application for patent is a continuation of application, Serial No. 617,267, in so far as mechanism common to the two applications is concerned.

Spreading devices as heretofore employed have been constructed as a unitary machine having the material hopper formed as a component part of the spreader structure, which in operation are either horse drawn or attached as trailers to a motor vehicle. These machines are not only an expensive piece of equipment but their operation is neither efficient nor satisfactory because they are used primarily to distribute stone chips upon a freshly tarred road, and consequently the means whereby they are drawn over the hot liquid tar must first travel over the tarred surface. This not only removes a considerable area of the tar by adhesion to the wheels of the pulling vehicle but also causes the latter to be clogged and coated with tar.

Some of the objects of the present invention are to provide an improved chip spreading device; to provide a spreader for stone chips and other finely divided material as an attachment or accessory for a dumping truck; to provide a spreading device which is so constructed and associated with a truck as to distribute the stone chips or other material upon a fresh tarred or oiled surface in advance of the wheels of the truck; to provide a spreading device for road work which is fed from a supply vehicle and distributes the material in advance of the wheels of both the vehicle and the spreading device; and to provide other improvements as will hereinafter appear.

Figure 1:
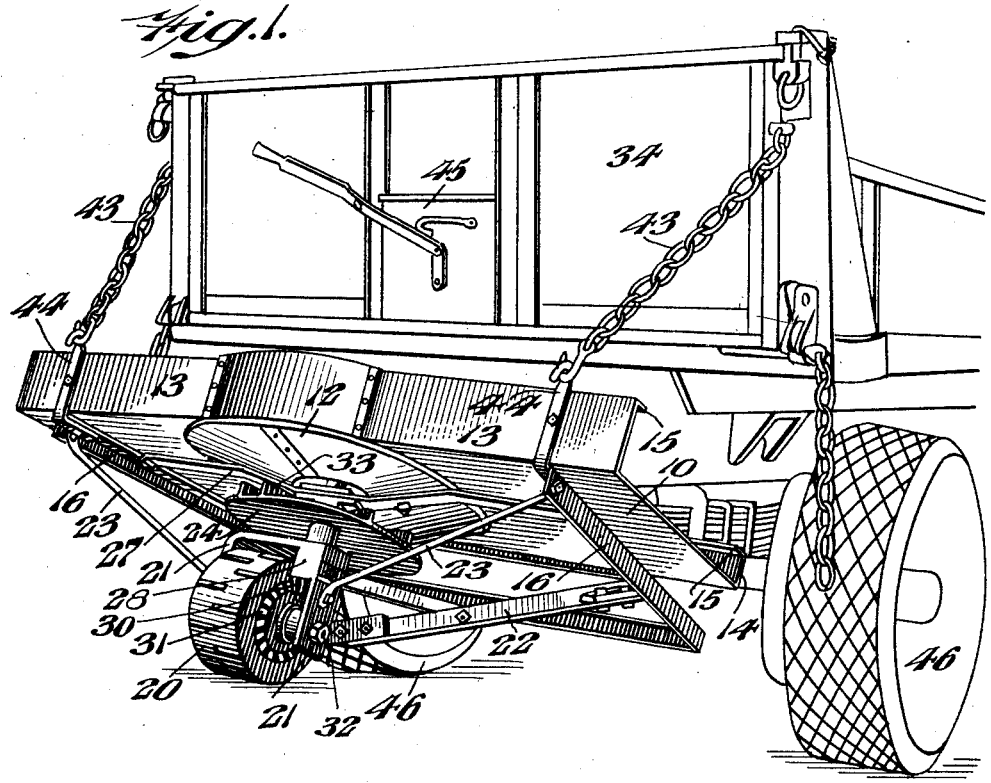
Figure 2:
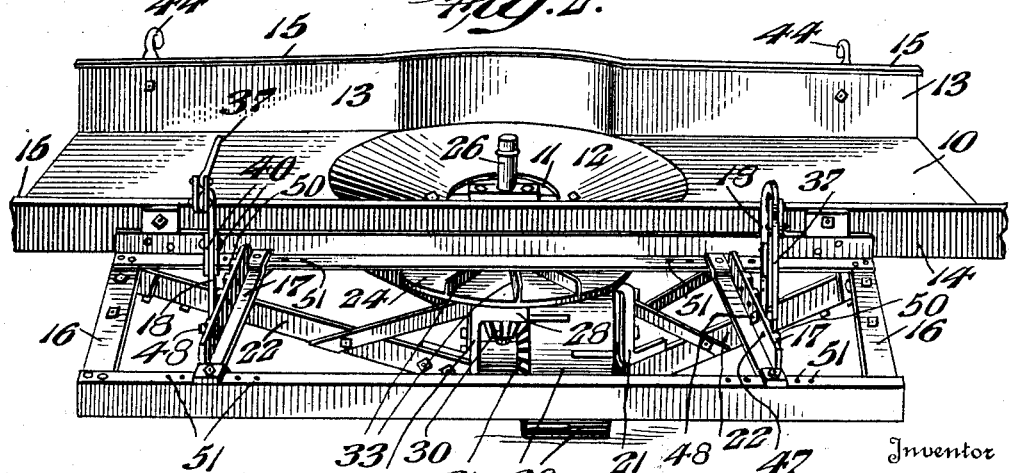

In the accompanying drawings Fig. 1 represents a perspective of a chip spreader embodying one form of the present invention shown attached to a motor truck and suspended in carrying or inoperative position; Fig. 2 represents a perspective of the spreader viewed from above; Fig. 3 represents a perspective of the spreader in operative position at the rear of a material supply truck; Fig. 4 represents a sectional elevation of the spreader; Fig. 5 represents a perspective of the spreader in operating position and receiving its supply of material from a dumping truck; and Fig. 6 represents a perspective of the spreader from an angle beneath the receiving platform.

Referring to the drawings, one form of the present invention consists of a material receiving platform or hopper 10 provided with a discharge outlet 11 to which the material is fed by gravity by a funnel-shaped part 12. In the present instance the hopper 10 has two opposite side walls 13 and 14, while the ends are open, though this can obviously be varied to meet conditions. Preferably the walls 13 and 14 have inturned flanges 15 respectively to prevent overflow should the hopper be supplied faster than the spreader can discharge the material.

For supporting the hopper 10, a rigid frame 16 of generally rectangular form is provided and is preferably constructed of angle iron to which the hopper 10 is securely bolted. This frame 16, as here shown, projects beyond the rear wall 14 of the hopper in order to provide a rugged support for cross braces 17 which serve respectively to mount vertical posts 18 for the purpose of attaching the spreading apparatus to the vehicle with which it is to be used. In operating position the frame 16 is arranged to be supported by a traction wheel 20 having a relatively wide tread face, the said wheel being journaled in a bearing yoke 21 carried by thrust arms 22 converging from the rear frame portion to thus form a rigid, strong skeleton construction capable of transmitting the propelling force acting upon the rear of the apparatus. Laterally disposed brace members 23 are interposed between the forward end of the frame 16 and the yoke 21 to resist side strain.

In order to distribute the material as it feeds through the discharge outlet a disc 24 is fixed to a shaft 25 which extends axially through the outlet 12 and is journaled at one end in a sleeve 26 supported by a transverse strap iron 27 bolted to the hopper 10 and frame 16. The other end of the shaft 25 is journaled in a head 28 and carries a pinion 30 in mesh with a bevel gear 31 fast to the wheel 20. Radially arranged ribs 33 are provided upon the material receiving surface of the disc 24 and serve to assist in the centrifugal projecting of the material.

For rigidly attaching the frame 16 to a material supplying truck 34, preferably to the rear end thereof, the posts 18 terminate respectively in hooks 35, each of which is provided with a clamping latch 36 comprising a pair of links pivoted to the hook end and having a keeper 37 pivoted between their opposite ends for encircling a cross bar 38 of the vehicle. The respective keepers 37 are made fast to the bar 38 by pivoted links 40 arranged for adjustable connection with the posts 18 by pins 41 and holes 42. This adjustable construction provides a range of attachment sufficient for all the ordinary sizes of cross bars 38 in general use.

For carrying the spreading mechanism from one location to the other it is convenient to elevate it from its operative position to the position shown in Fig. 1 where it is suspended by chains 43 engaging permanent hooks 44 fastened to the front wall 13 of the hopper 10. Thus to transport the spreader it need not be detached from the truck with which it happens to have been last in use and can be quickly lifted and fastened by the engagement of the chains 43.

In connection with the posts 18 it should be noted that these are arranged for adjustment upon the cross braces 17 so that differences in the over-hang of the trucks or other vehicles can be taken care of. To that end the braces 17 are provided with spaced holes 47 and a single fastening bolt 48 only need be employed because vertical ribs 50 on the side faces of the respective braces 17 prevent edgewise displacement of the posts 18. Another adjustment is also possible by reason of holes 51 along the frame bars and the cross braces 17 have forked ends to straddle the frame bars and provide for relative sliding movement to any selected position. This adjustment of the braces toward and away from each other compensates for vehicle bodies of different width because the braces 17 can be quickly adjusted to any new position desired.

By reference to Fig. 5 it will be seen that the device is attached by the posts 18 to the rear cross bar 38 of a dumping truck 34 with the hopper 10 in substantially horizontal position supported by the traction wheel 20. The truck 34 and the spreader are now located at the beginning of a freshly tarred stretch of road but the wheels of neither vehicle are upon the tarred surface. The truck body is now raised to dumping position, as seen in Fig. 5, and the discharge door 45 is opened to release the material so that it falls by gravity into the funnel-shaped portion of the hopper 10. As soon as the material comes under the control of the distributing disc 24 and begins to cover the tarred or oiled surface in advance of both the wheel 20 and the wheels 46 of the truck, the truck is moved rearwardly under its motive power to thereby push the spreading device over the tarred road in advance of the truck so that the surface of the road is well covered with stone chips, gravel, or any other suitable material before any of the vehicle wheels reach the tar. Thus broadly the present invention comprehends the travel of a spreader in advance of a material supplying vehicle, the direction of movement being such that neither the spreading device nor the supplying vehicle passes over a tarred, asphalted or oiled, or otherwise freshly coated surface prior to the spreading of a protecting coating of stone chips, gravel, sand, or whatever the material may be. It will furthermore be apparent that the spreading device of the present invention is for use with any vehicle containing a supply of sand, gravel or chips and therefore can be quickly attached to or detached from a motor truck or can be connected first to one truck and when the supply from that truck has been exhausted it can be transferred and connected to another truck.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A spreading apparatus for roadways comprising in combination a motor driven truck having a body arranged to tilt to discharge at the rear of said truck, a material spreading unit separate from said truck comprising a spreading device for lateral distribution of a road surfacing material, a hopper arranged to discharge into said spreading device, and a wheel for said device, and means for attaching said unit to a part of said truck other than said body whereby material is fed to said hopper in any discharging position of said body.

2. A spreading apparatus for roadways comprising in combination a motor driven truck having a body arranged to tilt for material discharge purposes, a material spreading unit separate from said truck comprising a spreading device for lateral distribution of a road surfacing material, a hopper arranged to discharge into said spreading device, a wheel for said spreading device and hopper, and power means actuated by said wheel for operating said spreading device, and means for attaching said unit to a part of said truck other than said body whereby material is fed to said hopper in any discharging position of said body.

3. A spreading apparatus for roadways comprising a motor driven truck having a body arranged to tilt to discharge at the rear of said truck, in combination with a material spreading unit comprising a spreading device for lateral distribution of a road surfacing material, a hopper arranged to discharge into said device, said hopper having a length substantially equal to the width of said truck, a support for said hopper and spreading device including a wheel, means actuated by said wheel for actuating said spreading device, and means for attaching said unit to said truck whereby material is fed to said hopper in any discharging position of said body.

4. A spreading apparatus for roadways, comprising the combination with a material carrier vehicle having a transverse cross-bar in the frame thereof, of a wheeled frame, a hopper in said frame, a spreader beneath said hopper, cross-bar attaching devices rigidly secured in said frame and pivotally attached to said cross-bar, and means in said frame for adjusting said attaching devices in said frame laterally thereof.

5. A spreading apparatus for roadways, comprising the combination with a material truck, of a frame pivotally connected to said truck to swing upwardly and outwardly thereof, a bearing wheel in said frame, a hopper in said frame, a spreader in said frame and operable from said bearing wheel, and means for supporting said frame in upswung position against the truck.

6. A spreading apparatus for roadways, comprising a frame, means to support said frame to travel upon the ground, a spreader member rotatably mounted upon said frame, means to rotate said spreader member, a hopper carried by said frame and having an opening to deliver material to said spreader member, brace bars in said frame and lengthwise thereof, a plurality of sockets longitudinally formed on said brace bars, and vehicle attaching members receivable in said sockets for rigid connection with said frame.

7. A spreading apparatus for roadways, comprising a frame, means to support said frame to travel upon the ground, a spreader member rotatably mounted upon said frame, means to rotate said spreader member, a hopper carried by said frame and having an opening to deliver material to said spreader member, brace bars in said frame, vehicle attaching members carried by said brace bars, and means for adjusting said brace bars in said frame transversely thereof.

8. A spreading apparatus for attachment to a vehicle for movement thereby in advance thereof including a frame, means on the frame for detachably engaging the propelling vehicle, a wheel supporting the frame, a hopper mounted on the frame having an outlet, a disc mounted for rotation beneath said outlet, and means driven by said supporting wheel for rotating the disc to spread material in the path of said wheel during the movement of the spreading machine in advance of its propelling vehicle.

9. A spreading apparatus for attachment to a vehicle for movement thereby in advance thereof including a frame, means on the frame for detachably engaging the propelling vehicle, a wheel supporting the frame, a hopper mounted on the frame having an outlet, a disc mounted for rotation beneath said outlet, means driven by said supporting wheel for rotating the disc to spread material in the path of said wheel during the movement of the spreading machine in advance of its propelling vehicle, and means on said frame for adjusting said vehicle engaging means for chassis width and height, and vehicle body overhang.

Signed at St. Louis, State of Missouri, this 7th day of March, 1927.

BENJAMIN F. HAYDEN.

DISCLAIMER 1,715,325.—*Benjamin F. Hayden*, St. Louis, Mo. SPREADING APPARATUS. Patent dated May 28, 1929. Disclaimer filed August 9, 1933, by the assignee, *Good Roads Company, Inc.*

Hereby enters this disclaimer to that part of the claims in said specification which are in the following words, to wit:

"5. A spreading apparatus for roadways, comprising the combination with a material truck, of a frame pivotally connected to said truck to swing upwardly and outwardly thereof, a bearing wheel in said frame, a hopper in said frame, a spreader in said frame and operable from said bearing wheel, and means for supporting said frame in upswung position against the truck.

"6. A spreading apparatus for roadways, comprising a frame, means to support said frame to travel upon the ground, a spreader member rotatably mounted upon said frame, means to rotate said spreader member, a hopper carried by said frame and having an opening to deliver material to said spreader member, brace bars in said frame and lengthwise thereof, a plurality of sockets longitudinally formed on said brace bars, and vehicle attaching members receivable in said sockets for rigid connection with said frame."

[*Official Gazette September 5, 1933.*]